R. M. CLARK.
ANIMAL TROUGH.
APPLICATION FILED JULY 30, 1913. RENEWED APR. 1, 1916.

1,181,740.

Patented May 2, 1916.
2 SHEETS—SHEET 1.

Witnesses
A. A. Johnson
F. L. Stewart

Inventor
Robert M. Clark
By Letrief J. Cilley
Attorney

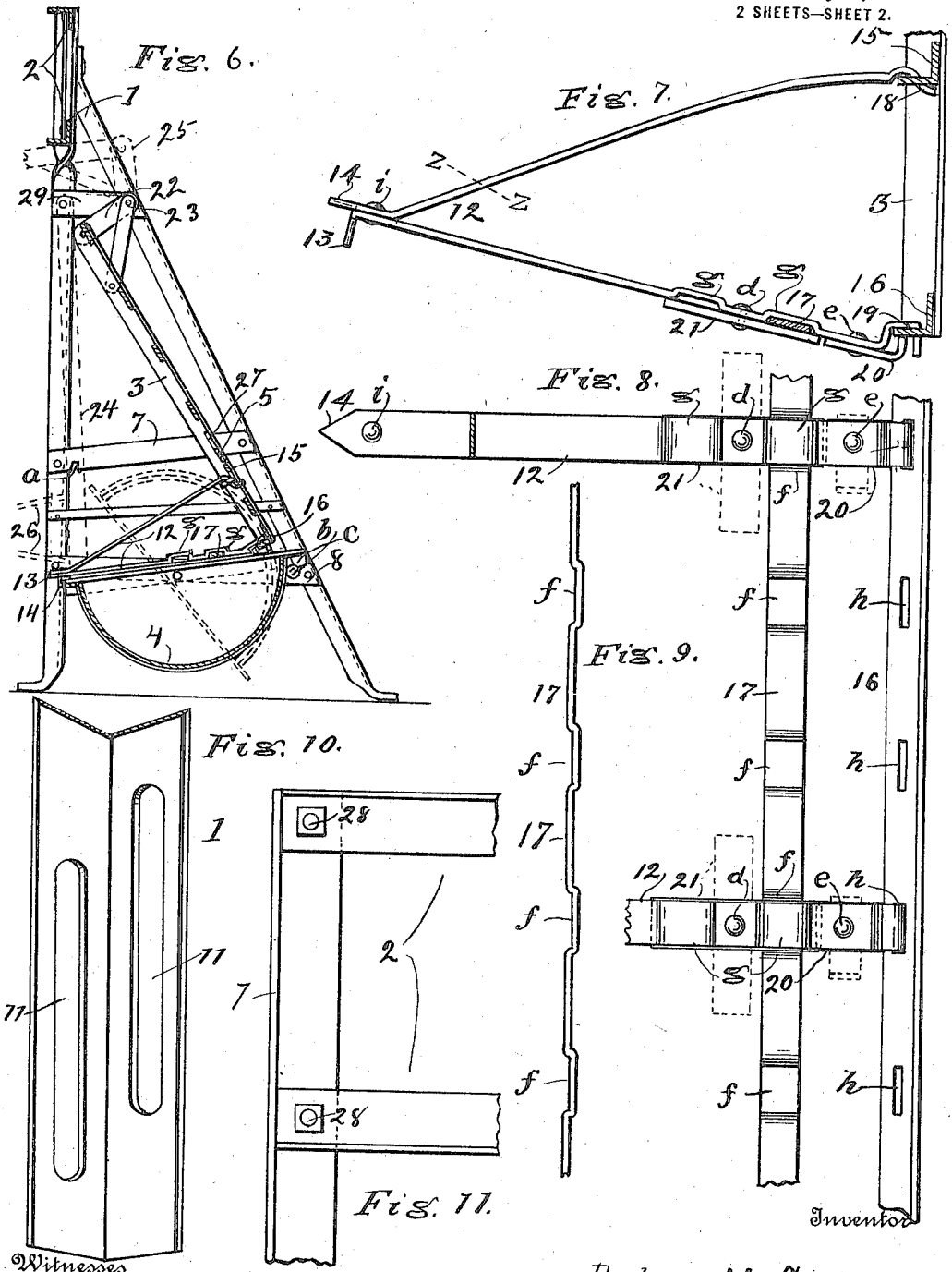

UNITED STATES PATENT OFFICE.

ROBERT M. CLARK, OF GRAND RAPIDS, MICHIGAN, ASSIGNOR TO FRANK L. STEWART, OF BOYNE FALLS, MICHIGAN.

ANIMAL-TROUGH.

1,181,740. Specification of Letters Patent. Patented May 2, 1916.

Application filed July 30, 1913, Serial No. 782,076. Renewed April 1, 1916. Serial No. 88,422.

*To all whom it may concern:*

Be it known that I, ROBERT M. CLARK, a citizen of the United States, residing at Grand Rapids, in the county of Kent and State of Michigan, have invented certain new and useful Improvements in Animal-Troughs, of which the following is a specification.

My invention relates to improvements in troughs for feeding swine, sheep, goats, and like animals, and its objects are: First, to provide a trough having a swinging gate that will form a part of the fence that incloses the lot or pen in which the animals are confined, and that may be opened sufficiently to allow of passing the animals out of the inclosure when desired. Second, to provide a trough having partitions that may be readily moved and adjusted to accommodate animals of different sizes at the same trough, as, for instance, small pigs or shote at one end of the trough, and full grown hogs at the other end. Third, to provide a means whereby the lower edge of the gate may be reinforced from the edge of the trough. Fourth, to provide a means whereby the animals may be prevented from getting their fore feet into the trough when eating therefrom. Fifth, to provide a means whereby every partition will be made to reinforce and strengthen, or brace every other partition the entire length of the gate. Sixth, to provide a gate frame or support that may be readily assembled or taken apart for convenient shipment. Seventh, to provide a means whereby the gate support or frame may be readily adjusted to varying ground surfaces, as of ground that is slightly inclined from the horizontal so that one end of the trough would, normally, be a little lower than the other end. Eighth, to provide a trough frame that may be made to support itself and its gate and trough without the use of posts or other foreign supporting element. I attain these objects by the mechanism illustrated in the accompanying drawing, in which—

Figure 1:
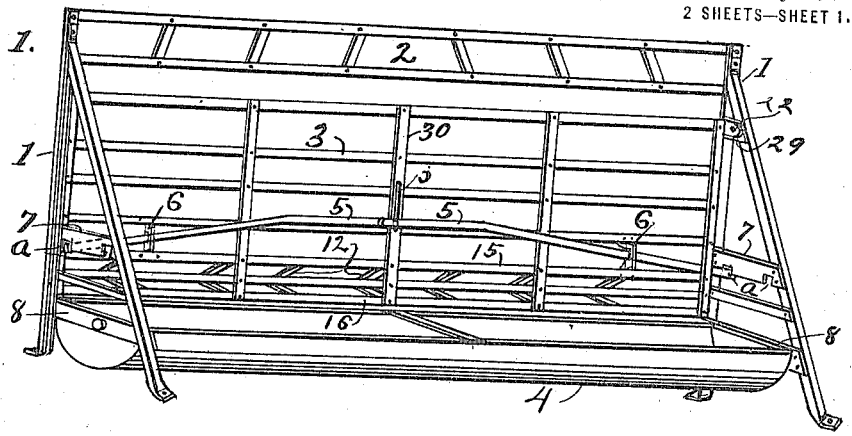
Figure 2:
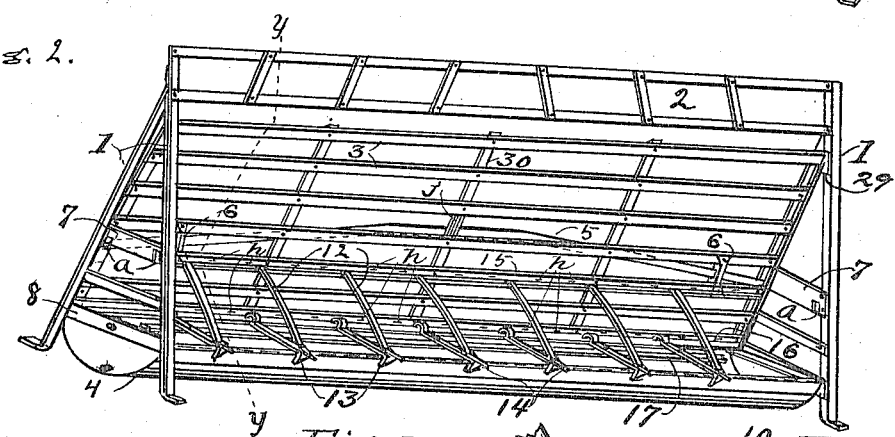
Figures 3, 4, 5:
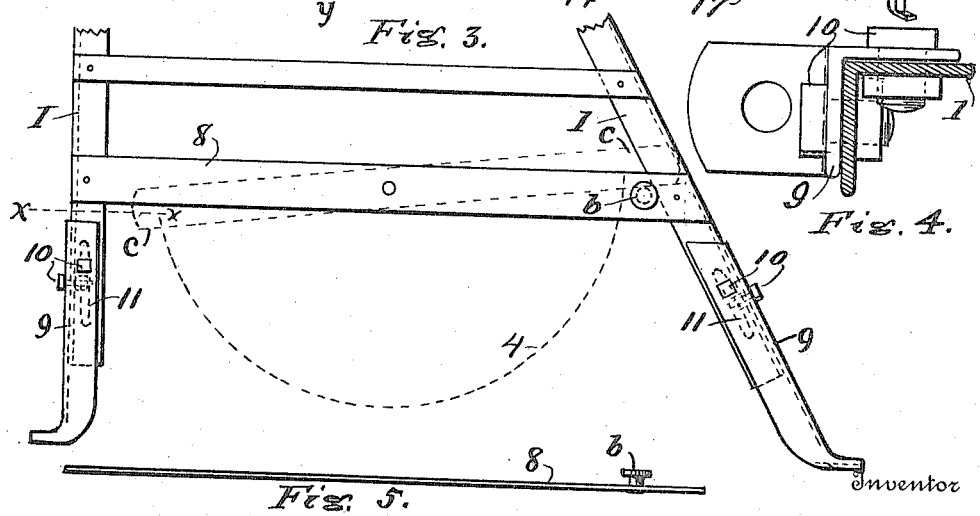

Figure 1 is a perspective of the trough and its supporting frame and gate looking at it from the outside, and with the gate swung back preparatory to emptying or filling the trough. Fig. 2 is a like view looking at the trough from the pen side, and with the gate swung to position to give the animals access to the trough. Fig. 3 is an elevation of the lower portion of one end of the frame showing the extensions at the bottoms of the legs for adjusting the frame to the surface of the ground upon which it is to stand. Fig. 4 is a sectional plan of the leg of the frame on the line $x\ x$ of Fig. 3. Fig. 5 is a detached edge view of the trough girt or bar showing the stud for supporting the trough in position for the animals to feed from. Fig. 6 is an end elevation of the frame with the trough, gate, and frame cut off on the line $y\ y$ of Fig. 2. Fig. 7 is a side elevation of the partition showing the manner of securing it to its supporting girts. Fig. 8 is a plan of two partitions showing their connection with their supporting girt and with the strengthening bar. Fig. 9 is an edge view of the strengthening bar. Fig. 10 is a perspective of the lower end of the frame post showing the slots for the adjustment of the lower end of the post. Fig. 11 is an elevation of the top of one of the frame posts and of the cross bars that tie the two ends together and support them.

Similar letters refer to similar parts throughout the several views.

The end, 1, of the frame is made up of two pieces of angle iron that are firmly riveted together at the top; one of which should stand practically vertical, and the other one at an angle therefrom to form a supporting brace. The lower ends of these angle irons have a trough supporting girt 8 connecting them in position to support the trough 4, a latch girt 7 in position to engage the latch 5 in the notches $a$ to hold the gate 3 in the desired position relative to the trough. The upper ends of the ends 1 are connected and supported by a properly braced pair of bars, 2, the ends of which are firmly bolted to the said ends as indicated in Fig. 6, for the purpose, first, of securing a perfectly firm connection between them, and, second, to render it easy and convenient to assemble or take down the frame when desired, for the purpose of rendering it easy and convenient to ship the entire outfit in the knock-down and assemble it at the point of destination. For this purpose I find it very convenient and desirable, though not absolutely necessary, to twist the vertical angle iron one quarter way around, as indicated in Fig. 6, so that the cross bars may be bolted to the inner surface of one of the flanges of the angle, as indicated at 2 in Fig. 6 and at 28 in Fig. 11.

I place a supporting girt 29 across from standard to brace at each end of the frame to which the arm 22 is pivoted, as at 23, for supporting and operating the gate 3. The gate 3 is made up of angle iron ends having longitudinal slats and vertical stay rods, as shown in Figs. 1 and 2, and is firmly secured to the free end of the pivoting arms 22, and thoroughly braced, as shown in Fig. 6, so that it may be made to swing over the trough 4, as indicated by its solid lines and dotted lines in Fig. 6, and as indicated in Figs. 1 and 2, the object of supporting it upon the arm 29 being to insure the raising of the lower end of the gate above the outer edge of the trough when the gate is swung to the position shown in Fig. 1 and indicated by its dotted lines in Fig. 6. The central vertical stay rod 30 of the gate 3 is slotted, as at $j$, to form a guideway for a pin on the latches 5 5. The latches 5 5 are slidingly secured to the outer surface of the gate in position to be readily accessible by the operator, and extend longitudinally of the gate to, and beyond each end thereof to position to be made to engage the notches $a\ a$ in the girt 7, to hold the gate in the desired position, as hereinbefore intimated.

The bars or cleats 15 and 16 of the gate are made of angle iron and are provided with slots or openings $h\ h$ for the reception and support of the free ends of the partitions 12. These partitions are made of band iron and, preferably, of two pieces with the outer ends firmly riveted together so that the under piece may be bent downward to form downwardly extending wedge shaped lugs 13 that are designed for two purposes, first, to engage the edge of the trough 4, as indicated in Fig. 2, for the purpose of strengthening the gate so that an animal cannot rush forcibly against it and bend the lower rails or girts, and, second, to form sharp projections downward to prevent hogs, when the troughs are used for feeding hogs, from getting their noses under the partitions and springing them upward. The upper pieces of which these partitions are formed have the outer ends formed wedge shape and projecting beyond the end of the lower pieces, as indicated at 14 in Figs. 2 and 7 to form guards that will prevent hogs from rooting against the partitions. The upper arms of these partitions are passed through slots or openings in the rail 15, as indicated at 18, in such a manner that when the partition is properly secured in place it will be impossible to remove the ends 18 until the lower arm has been removed from the rail 16. To secure the lower arm in the rail 16 the back end of the arm is formed into a channel shaped bearing 19, the end of which is passed through the slots $h\ h$ in the rail 16, when a button, 20, pivoted to the arm at $e$, is swung around to position to cause the flange of the rail 16 to be clamped between said button and the crown of the bearing 19, as indicated in Fig. 7.

For the purpose of preventing the animals from getting their feet into the trough 4 I form offsets $g$ in the lower arm of the partitions 12 and place therein a metal rod or strip of band iron, as 17, which is crimped or offset at intervals, as indicated at $f\ f$, so that the connecting points between these strips and the arm of the partitions will form closely fitting joints with a bearing on each of the four edges to make the connection as rigid and firm edgewise as possible. This strip is held in place by means of buttons 21 that are pivotally secured to the arms as at $d$, so that when they are thrown directly in alinement with the arm they will hold the strip firmly in place, but when the buttons are thrown around to the position indicated by the dotted lines in Fig. 8 the strip may be readily removed. For securing the outer ends of the arms that form the partitions, together, I prefer the use of rivets, as indicated at $i$, though other available means may be used.

When the troughs are used for feeding large hogs or other animals I place the strips 17 in the position indicated in Figs. 7 and 8 for the purpose of leaving as clear room in the trough outside of this strip, as possible, but when providing for feeding smaller animals I place the strips in the offset farthest from the rail 16, or in the vacant space shown in Fig. 7. It will be readily understood that as this strip lies with the lateral surface parallel with the lower arms of the partitions, and is firmly clamped in the offsets in said arms and in the strip, it acts as a very rigid support against the danger of an animal bearing against the outer ends of the partitions and forcing them out of position sidewise, or loosening them in their bearings in the rails 15 and 16. It will, also, be readily understood that these cleats form very strong supporting elements against the possibility of an animal pressing against the lower surface of the gate and bending the lower rails or cleats thereof, which, together with the provisions made for having the lugs 13 bear upon the front edge of the trough, renders the lower rails of the gate almost actual proof against any danger of being bent, no matter what pressure may be brought to bear upon them, within the strength of any animal that may be feeding from the trough.

The object of placing slots through the rails 15 and 16 at short intervals is to provide for placing the partitions some distance apart, or close together, according to the size of the animals to be fed. Thus, if large hogs are to be fed, the partitions will be placed at practically the proportional distance indicated in Fig. 8, but if shote are to be fed the partitions are placed one notch nearer together, and if small pigs are to be fed they are placed as near together as the slots in the rails will allow, or a partition in every slot.

The trough 4 is pivotally supported at each end by the girts 8 so it may be placed in position to receive the feed. In this position the edge of the trough is supported by the rim C resting on the stud b, as indicated in Fig. 6, and it is further supported by the partitions 12 resting on top of it. When it is desired to empty the trough it is thrown around on its pivot to the position indicated by its dotted lines in Fig. 6, the gate 3 having first been swung back to the position indicated by its dotted lines 24 26, in this figure, in which position the gate must stand when the trough is being filled with feed. When it is desired to open the gate so as to pass animals out of the pen, it will be made to assume practically the position indicated by the dotted lines 25 in Fig. 6, but for this purpose provisions must be made to draw the latches 5 5 back far enough to have the ends pass by the end of the frame, and for this purpose I place loops, as 6 on the gate that the latches may pass through and slide easily in, instead of swinging upon a pivotal bearing so that when the free ends of the latches are raised to the upper end of the slot j the other ends will be drawn back clear of the ends of the frame. For adjusting the frame that supports this trough to hold the trough level longitudinally on rolling ground, I form slots 11 11 in the lower ends of the legs of the frame 1 and fit feet 9 so that the bolts 10 may be passed through said feet and through the slots in the legs and the feet may be bolted firmly to place thereby, or the bolts may be loosened and the feet adjusted to the desired position and again secured by the bolts.

What I claim as new, and desire to secure by Letters Patent of the United States, is:

1. In an animal trough, a stationary supporting frame having a removable girt at the top, a trough pivotally secured near the bottom, and a gate pivotally secured near the top, with partitions secured to the gate and extending over the trough projecting spurs at the ends of the partitions, a strengthening bar secured to said partitions near the gate, and means for readily adjusting said partitions to different distances apart.

2. In combination with a self supporting frame having extensible legs thereon, a gate having a right angle arm at the upper end, said arm pivotally connected with the frame near the top thereof, a trough pivotally connected with the frame near the lower end thereof; with partitions detachably secured near the lower edge of the gate, a button pivotally secured to the partitions to lock the partitions to the gate, a strengthening bar connected with the partitions near the gate, offsets in the partitions for receiving the strengthening bar and varying the distance between the strengthening bar and the gate, and protecting points at the ends of the partitions.

3. In combination with a supporting frame, a trough pivotally secured near the lower end of the frame, a gate pivotally secured near the upper end of the frame, and a detachable girt connecting the tops of the ends of the frame; with angled girts secured near the bottom of the gate, and having slots formed in the projecting wing of the girts, partitions made to engage said slots to secure them to the girts, buttons for locking the partitions to one of said girts, offsets formed in one arm of the partitions, a strengthening bar secured in said offsets, buttons for securing said bar in said offsets, and projecting points on said partitions to engage the edge of the trough when in normal position, all substantially as shown and described and for the purpose set forth.

Signed at Grand Rapids, Michigan, July 25, 1913.

ROBERT M. CLARK.

In presence of—
ETHAN W. THOMPSON,
ORSON G. BURCH.

Copies of this patent may be obtained for five cents each, by addressing the "Commissioner of Patents, Washington, D. C."